Feb. 1, 1927.
C. C. KIRKHAM
BASEBALL GAME
Filed March 4, 1926    2 Sheets-Sheet 1
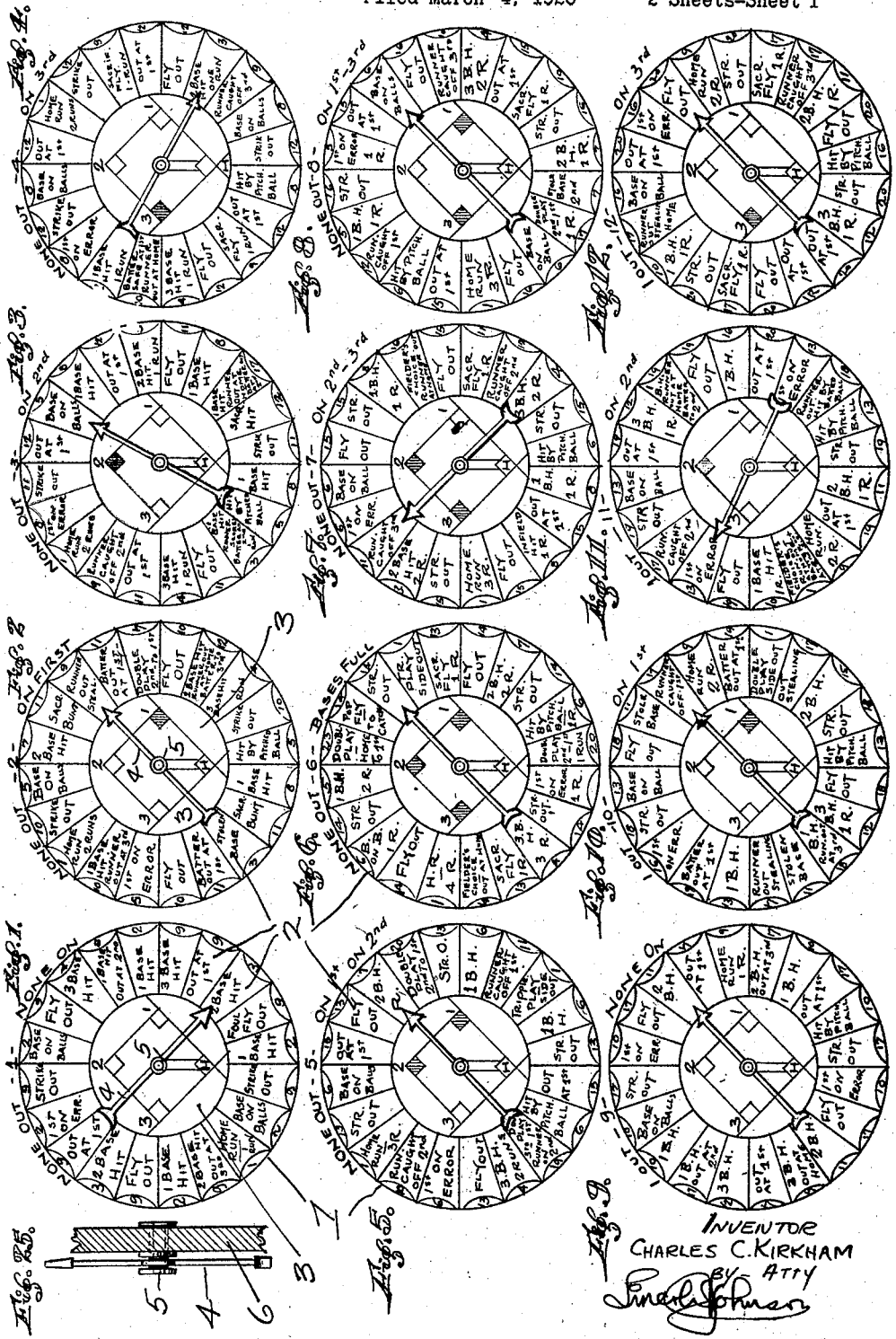
INVENTOR
CHARLES C. KIRKHAM
BY ATTY

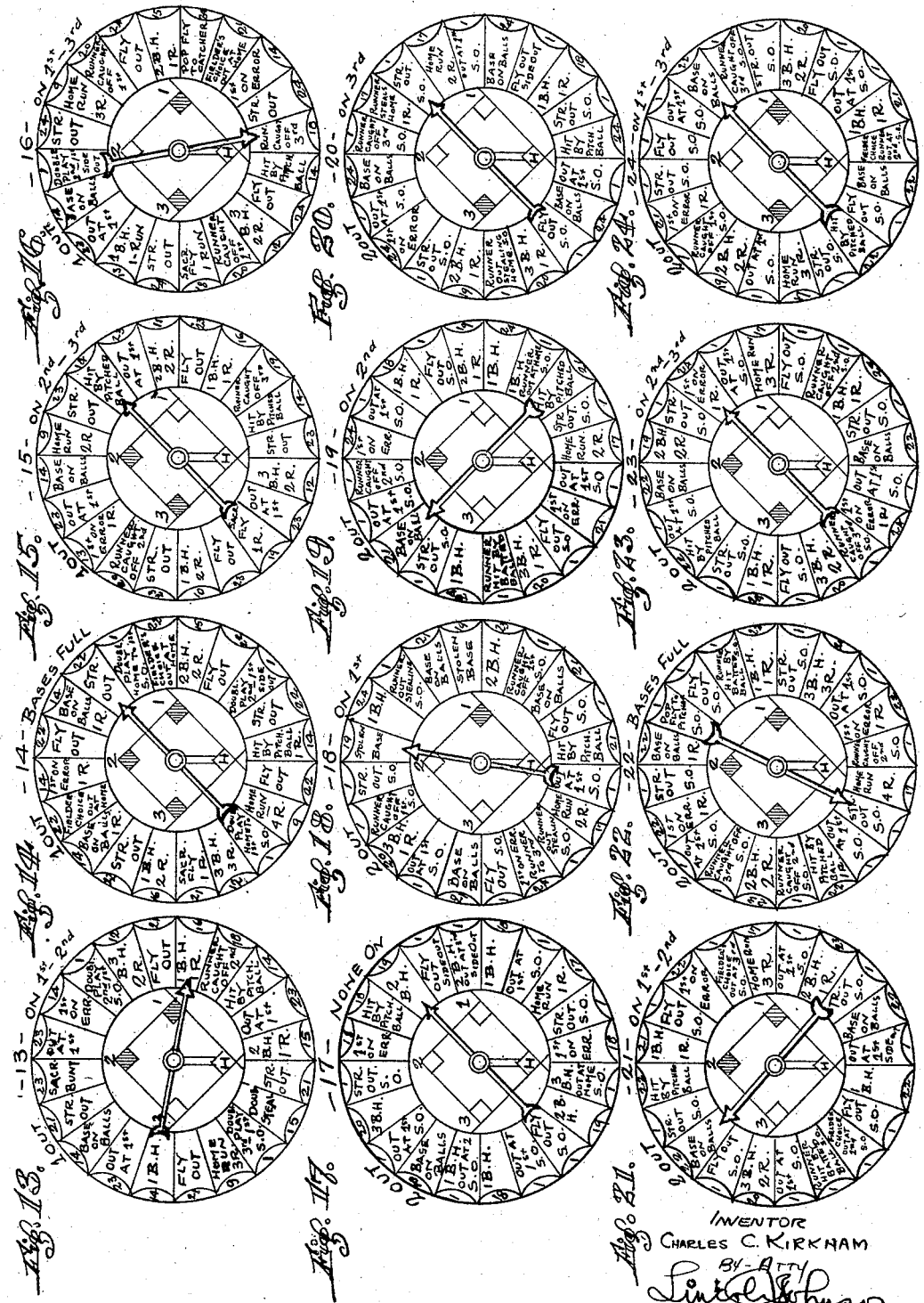

Patented Feb. 1, 1927.

1,615,985

UNITED STATES PATENT OFFICE.

CHARLES C. KIRKHAM, OF OAKLAND, CALIFORNIA.

BASEBALL GAME.

Application filed March 4, 1926. Serial No. 92,176.

This invention relates particularly to a baseball game amusement device.

An object of the invention is to provide a surface having a plurality of independent scales arranged in a predetermined relation thereon, the said scales being lettered and numbered so as to be operatively related one to the other, and each being provided with a member thereon to promote advance in play from one scale to another, until a one-half inning of baseball play has been completed.

A further object of the invention is to provide a baseball amusement device formed of a plurality of independent and numbered scales, each scale being substantially circular in form and divided into a plurality of perimetral sectors, lettered to indicate a variety of plays that arise during a one-half inning of baseball play, in combination with a number corresponding to one of the scale numbers, and a pictorial diagram to indicate visually the actual condition of the baseball play represented by that scale, together with means on each scale to promote continuous play from one scale to another during the three outs that constitute a one-half inning of baseball play.

Other objects of the invention are to provide a baseball game amusement device that is superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings,

Fig. 1 represents the first scale of the baseball game device, constructed in accordance with my invention, to indicate no "outs" and no players on the bases.

Fig. 2 is a scale indicating no "outs" and a player on first base.

Fig. 3 is a scale indicating no "outs" and a player on second base.

Fig. 4 is a scale indicating no "outs" and a player on third base.

Fig. 5 is a scale representing no "outs" and players on first and second bases.

Fig. 6 is a scale representing no "outs" and players on first, second and third bases.

Fig. 7 is a scale representing no "outs" and players on second and third bases.

Fig. 8 is a scale representing no "outs" and players on first and third bases.

Fig. 9 is a scale representing one "out" and no players on bases.

For 10 is a scale representing one "out" and a player on first base.

Fig. 11 is a scale representing one "out" and a player on second base.

Fig. 12 is a scale representing one "out" and a player on third base.

Fig. 13 is a scale representing one "out" and players on first and second bases.

Fig. 14 is a scale representing one "out" and players on first, second and third bases.

Fig. 15 is a scale representing one "out" and players on second and third bases.

Fig. 16 is a scale representing one "out" and players on first and third bases.

Fig. 17 is a scale representing two "outs" and no players on bases.

Fig. 18 is a scale representing two "outs" and a player on first base.

Fig. 19 is a scale representing two "outs" and a player on second base.

Fig. 20 is a scale representing two "outs" and a player on third base.

Fig. 21 is a scale representing two "outs" and players on first and second bases.

Fig. 22 is a scale representing two "outs" and players on first, second and third bases.

Fig. 23 is a scale representing two "outs" and players on second and third bases.

Fig. 24 is a scale representing two "outs" and players on first and third bases.

Fig. 25 is a section through any one of the dials showing the rotatable element to select the plays on the scales.

In the baseball game amusement device illustrated in the present invention, a plurality of scales are appropriately lettered so as to cover substantially every condition of baseball play that might arise during the three "outs" constituting a one-half inning of baseball play. I have provided twenty four scales, and the same are divided into sets of eight scales each. Each set of eight scales provides the plays which will ensue during each one of the "outs", of the three "outs", that constitute a one-half inning of baseball play. Each one of the scales is so related to every other scale that starting with the first scale, and running through all of the scales, and ending with the last scale, the baseball play is predetermined in accordance with the rules of the national pastime, without the necessity of calculating any plays in advance or resorting to any mental decisions to promote the play of the game.

In detail, the construction illustrated in the drawings in Fig. 1 represents a circular scale 1, divided circumferentially into a plurality of sectors 2, each of which are provided with lettering or indicia thereon to indicate a specific play that may arise during a baseball game. The scale 1, shown in Fig. 1, is typical of the other twenty-three scales, indicated in the drawings, with the exception that each of the scales 9 to 24 are arranged to take care of the condition of play as the number of "outs" is increased and the game has become more complex from the conditions of play that have arisen. Scales 1 through 8 inclusive depict the condition of play when there are no "outs" and players may be on, or not on, or on all, or some of the bases. Scales 9 through 16 inclusive represent the condition of play with one player "out" and players on, or not on, or on some, or all of the bases. Scales 17 through 24 inclusive represent the condition of play with two "outs" and players on, or not on, or on some, or all of the bases. In all of the scales, each of the sectors 2 are provided with a value or number thereon, which said value or number corresponds to that of the same scale, or one of the other scales, to indicate that the player will spin the hand of that scale having the corresponding indicating value thereon. The middle of each scale, within the perimetral sectors, is embellished with a pictorial diagram 3, characterizing the actual condition of baseball play represented by that scale. In scale 1 there are no "outs" and no players on bases, hence the various bases are indicated blank. In scale 2, a player has reached first base, and hence the first base is indicated dark to represent a player. The various other scales are also provided with the pictorial diagrams, each of which are shaded to visually indicate the positions of the base runners during the game. The scales 1 through 24 inclusive are each provided with a spinner 4 thereon, pivoted at 5 to the surface 6 on which the scales are impressed. The spinner 4 is rotated manually, and allowed to come to a stop over any sector, and to thereby select a specific baseball play.

The game is played in the following manner. Starting with scale 1, the spinner 4 is turned and it selects a two base hit as the first play of the first player to bat. The sector 2 having the two base hit indicated thereon, is also provided with the value 3 thereon, meaning that the player should next spin the spinner on the scale 3. By advancing to the scale 3, it will be noted that the "two-base hit", made in scale 1, is indicated by a player on second base. In the scale 3 the spinner is rotated and selects as the next play a "base-on-balls", and the following play to be made on scale 5. Reference to scale 5 shows players on first and second base. The spinner on scale 5 selects a "two-base hit" whereby the player on second base scores "one run" and reference is made to scale 7, where it is shown that players are on second and third base. The spinner in scale 7 indicates the runner "caught off third" and a player on second base. The selected play in scale 7 refers to scale 11, showing a player on second base and one player "out" due to the condition of play indicated on scale 7. In scale 11 the spinner 4 selects that the batter should reach "first base on error", and refers to scale 13, where it is shown that with one "out", players are on the first and second bases. The spinner in scale 13 selects a "one base hit" whereby the player on second base scores a "run" and further play to be made on scale 16, which shows players on first and third base. In scale 16 the spinner selects tagged "out on third base", and refers to scale 18. Scale 18 shows two "outs" with a player on first base. The spinner on scale 18 selects as a play a "stolen-base" whereby the player on first base advances to second base and further play indicated to be made on scale 19. On scale 19 the spinner selects as the play, "base-on-balls" and refers to scale 21, which shows players on first and second bases. In scale 21, the spinner selects as the play, "base-on-ball" and refers to scale 22, which shows players on first, second and third bases. On scale 22, the spinner selects as a play, "strike-out", making the third "out" of the one-half inning, retiring the side and allowing the opposing team to go to bat. The opposing team then starts on from scale 1 and proceeds through the spinning operations from one scale to another until the three "outs" constituting a one-half inning of baseball play had been consumed. It should be noticed that each scale is so provided with the indicating matter thereon that reference is made to the same or one of the other scales to promote continuous play from the first scale through to the last scale.

Having thus described this invention, what I now claim and desire to secure by Letters Patent is:

1. A baseball game comprised of a plurality of independent scales each having a different indicating value thereon and each scale being divided into a plurality of circumferentially arranged sectors, and the sectors provided with a specific baseball play and value corresponding to one of the scale values; and means on each scale to select a determined sector to indicate a specific play and to refer to the same or other scales to promote continuous play until three "outs" have been made.

2. A baseball game comprised of a plurality of independent scales, each having a different indicating value thereon and each scale representing a different condition of play arising during a one-half inning of baseball play; a plurality of divisions arranged perimetrally around each scale, each division having a specific baseball play and value corresponding to one of the scale values thereon; means on each scale to select one of the divisions thereon to indicate a specific baseball play and scale value to promote the continuous play during a one-half inning of baseball play.

3. A baseball game comprised of a plurality of scales each having a designating indicia thereon; means to indicate a variety of plays that arise during a one-half inning of baseball play arranged circumferentially around each scale in conjunction with a designating indicia referring to the same or one of the other scales; and means on each scale to select a determined play and to refer, by means of the indicia adjacent the play designated, to the same or a different scale to promote continuous play during a one-half inning of baseball play.

4. A baseball game comprised of a plurality of independent scales each having a designating value thereon and each scale having a plurality of circumferentially arranged means thereon to indicate a variety of plays that arise during a one-half inning of baseball play; a value corresponding to some one of the scale values arranged adjacent each of the play indicating means; a pictorial diagram in each scale characterizing the actual condition of baseball play represented by said scale; and means on each scale to select a determined play and to refer, by means of the value adjacent the play designated, to the same or a different scale to promote continuous play during the three "outs" constituting a one-half inning of baseball play.

In testimony whereof, I have hereunto set my hand at San Francisco, California, this 12th day of February 1926.

CHARLES C. KIRKHAM.